(12) United States Patent
Chae

(10) Patent No.: US 10,541,848 B2
(45) Date of Patent: Jan. 21, 2020

(54) METHOD AND APPARATUS FOR GENERATING AND TRANSMITTING REFERENCE SIGNAL AND DATA IN WIRELESS COMMUNICATION SYSTEM

(71) Applicant: LG ELECTRONICS INC., Seoul (KR)

(72) Inventor: Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/064,437

(22) PCT Filed: Dec. 21, 2016

(86) PCT No.: PCT/KR2016/015022
§ 371 (c)(1),
(2) Date: Jun. 20, 2018

(87) PCT Pub. No.: WO2017/111466
PCT Pub. Date: Jun. 29, 2017

(65) Prior Publication Data
US 2018/0375710 A1   Dec. 27, 2018

Related U.S. Application Data

(60) Provisional application No. 62/270,049, filed on Dec. 21, 2015.

(51) Int. Cl.
*H04L 27/26* (2006.01)
*H04W 4/70* (2018.01)
(Continued)

(52) U.S. Cl.
CPC ........ *H04L 27/2649* (2013.01); *H04L 5/0048* (2013.01); *H04W 4/70* (2018.02); *H04W 72/0406* (2013.01); *H04W 72/0446* (2013.01)

(58) Field of Classification Search
CPC ............. H04L 27/2649; H04L 5/0048; H04W 72/0446; H04W 72/0406; H04W 4/70
See application file for complete search history.

(56) References Cited

U.S. PATENT DOCUMENTS

2012/0250642 A1* 10/2012 Qu .................. H04W 48/12
370/329
2013/0114514 A1   5/2013 Nissila et al.
(Continued)

FOREIGN PATENT DOCUMENTS

CN          103209060      7/2013
WO          2014155198     10/2014

OTHER PUBLICATIONS

PCT International Application No. PCT/KR2016/015022, Written Opinion of the International Searching Authority dated Mar. 20, 2017, 17 pages.

(Continued)

*Primary Examiner* — Mohammad S Anwar
(74) *Attorney, Agent, or Firm* — Lee Hong Degerman Kang Waimey

(57) ABSTRACT

One embodiment of the present invention relates to a method for a terminal generating and transmitting a reference signal and data in a wireless communication system, comprising the steps of: generating a sequence corresponding to a basic bandwidth; generating a demodulation reference signal (DMRS) corresponding to the entire bandwidth by mapping the generated sequence onto a frequency band; truncating the generated DMRS according to the bandwidth of data to be transmitted; and transmitting the truncated DMRS and the data.

13 Claims, 14 Drawing Sheets

(51) Int. Cl.
*H04L 5/00* (2006.01)
*H04W 72/04* (2009.01)

(56) References Cited

U.S. PATENT DOCUMENTS

| | | | |
|---|---|---|---|
| 2014/0016556 A1* | 1/2014 | Shimezawa | H04L 5/0035 370/328 |
| 2014/0341180 A1 | 11/2014 | Liu et al. | |
| 2015/0078272 A1* | 3/2015 | Kim | H04L 5/0005 370/329 |
| 2015/0181572 A1 | 6/2015 | Guo et al. | |

OTHER PUBLICATIONS

CATT, "Further discussion on DMRS enhancements in PC5-based V2V", 3GPP TSG RAN WG1 Meeting #83, R1-156610, Nov. 2015, 7 pages.
European Patent Office Application Serial No. 16879333.9, Search Report dated Jul. 1, 2019, 12 pages.
Nokia, "UL Reference Signals", 3GPP TSG RAN WG1 Meeting #47bis, R1-070384, XP050104416, Jan. 2007, 3 pages.
Huawei, et al., "Transmission and reception in the D2DSS/PD2DSCH overlapped resource", 3GPP TSG RAN WG1 Meeting #79, R1-144570, XP050875662, Nov. 2014, 5 pages.
Intel, "Design of Primary D2D Synchronization Signal", 3GPP TSG RAN WG1 Meeting #79, R1-144648, XP050875735, Nov. 2014, 12 pages.

* cited by examiner

FIG. 5
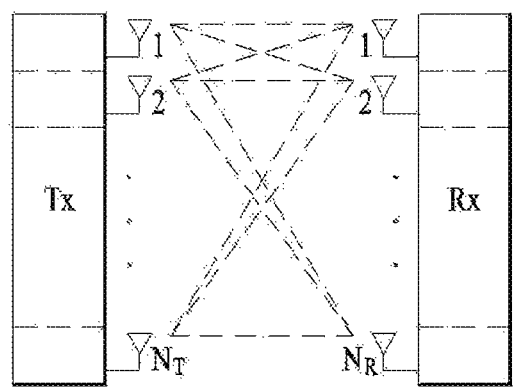
(a)
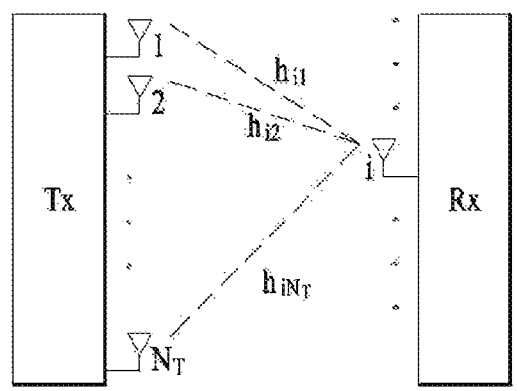
(b)

FIG. 8
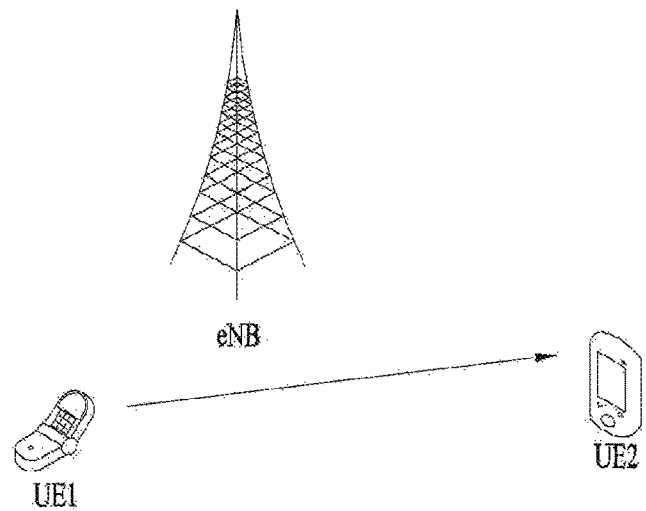
(a)
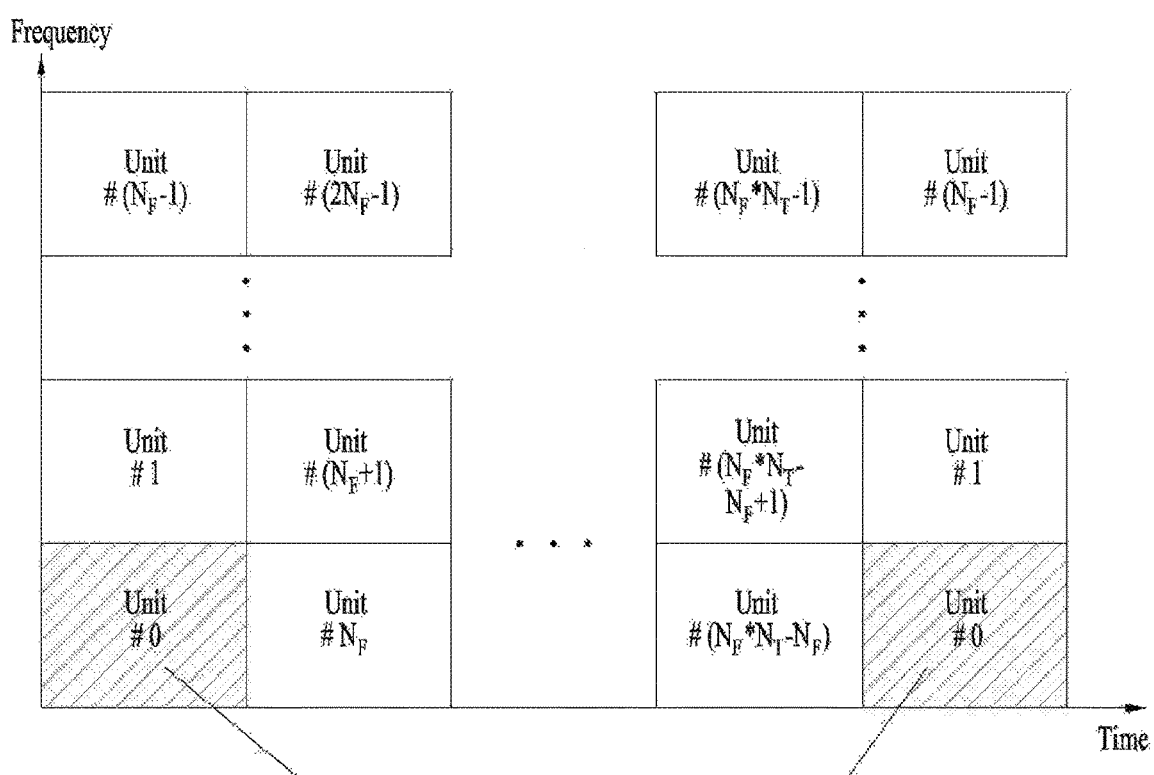
(b)

*CBP: Channel busy percentage

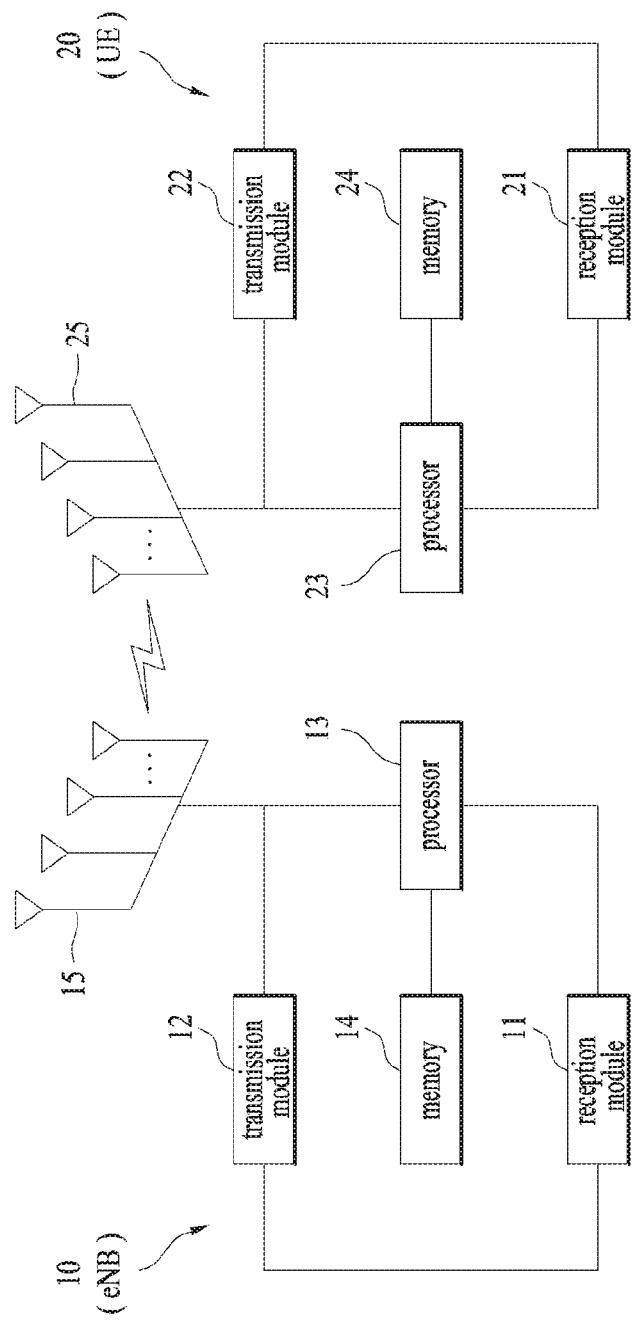

METHOD AND APPARATUS FOR GENERATING AND TRANSMITTING REFERENCE SIGNAL AND DATA IN WIRELESS COMMUNICATION SYSTEM

CROSS-REFERENCE TO RELATED APPLICATIONS

This application is the National Stage filing under 35 U.S.C. 371 of International Application No. PCT/KR2016/015022, filed on Dec. 21, 2016, which claims the benefit of U.S. Provisional Application No. 62/270,049, filed on Dec. 21, 2015, the contents of which are all hereby incorporated by reference herein in their entirety.

TECHNICAL FIELD

The present invention relates to a wireless communication system, and more particularly, to a method and apparatus for a user equipment to generate and transmit a reference signal and data.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system. D2D communication is a communication scheme in which a direct link is established between User Equipments (UEs) and the UEs exchange voice and data directly without an evolved Node B (eNB). D2D communication may cover UE-to-UE communication and peer-to-peer communication. In addition, D2D communication may be applied to Machine-to-Machine (M2M) communication and Machine Type Communication (MTC).

D2D communication is under consideration as a solution to the overhead of an eNB caused by rapidly increasing data traffic. For example, since devices exchange data directly with each other without an eNB by D2D communication, compared to legacy wireless communication, network overhead may be reduced. Further, it is expected that the introduction of D2D communication will reduce procedures of an eNB, reduce the power consumption of devices participating in D2D communication, increase data transmission rates, increase the accommodation capability of a network, distribute load, and extend cell coverage.

DISCLOSURE OF THE INVENTION

Technical Task

The technical task of the present invention is to provide a method of generating and transmitting a reference signal according to a transmission band of data.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of generating and transmitting a reference signal and data in a user equipment of a wireless communication system, including generating a sequence corresponding to a basic bandwidth, generating a DMRS (demodulation reference signal) corresponding to a full bandwidth by mapping the generated sequence to a frequency band, truncating the generated DMRS by an amount corresponding to a bandwidth of data to transmit, and transmitting the truncated DMRS and the data.

In another technical aspect of the present invention, provided herein is a user equipment, including a transmitter, a receiver, and a processor configured to generate a sequence corresponding to a basic bandwidth, generate a DMRS (demodulation reference signal) corresponding to a full bandwidth by mapping the generated sequence to a frequency band, truncate the generated DMRS by an amount corresponding to a bandwidth of data to transmit, and transmit the truncated DMRS and the data.

The basic bandwidth may be determined in a manner that a rate of a minimum data bandwidth over the basic bandwidth is equal to or greater than a preset threshold.

The threshold may be 0.04.

The DMRS corresponding to the full bandwidth may be identically generated by a user equipment receiving the data.

The DMRS corresponding to the full bandwidth, which is generated by the user equipment receiving the data, may be used for correlation with the truncated DMRS.

The sequence corresponding to the basic bandwidth may include a CAZAC sequence of a largest prime number not exceeding a size of the basic bandwidth.

The DMRS corresponding to the full bandwidth may be generated by mapping the generated sequence to a frequency resource within the basic bandwidth sequentially and repeatedly and then repeating the sequence mapped to the basic bandwidth in the full bandwidth.

The DMRS corresponding to the full bandwidth may be generated by mapping the generated sequence to a frequency resource within the basic bandwidth sequentially and repeatedly.

The DMRS corresponding to the full bandwidth may be generated by mapping the generated sequence to a frequency resource within the basic bandwidth sequentially and repeatedly.

Advantageous Effects

According to an embodiment of the present invention, a reference signal can be generated and transmitted efficiently in aspect of PAPR (peak-to-average power ratio) despite considering a receiving user equipment.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 5 is a diagram for configuration of a wireless communication system having multiple antennas.

FIG. 8 shows an example of a D2D resource pool for D2D communication.

FIG. 15 is a diagram showing configuration of a transceiver device.

BEST MODE FOR INVENTION

Figure 1:
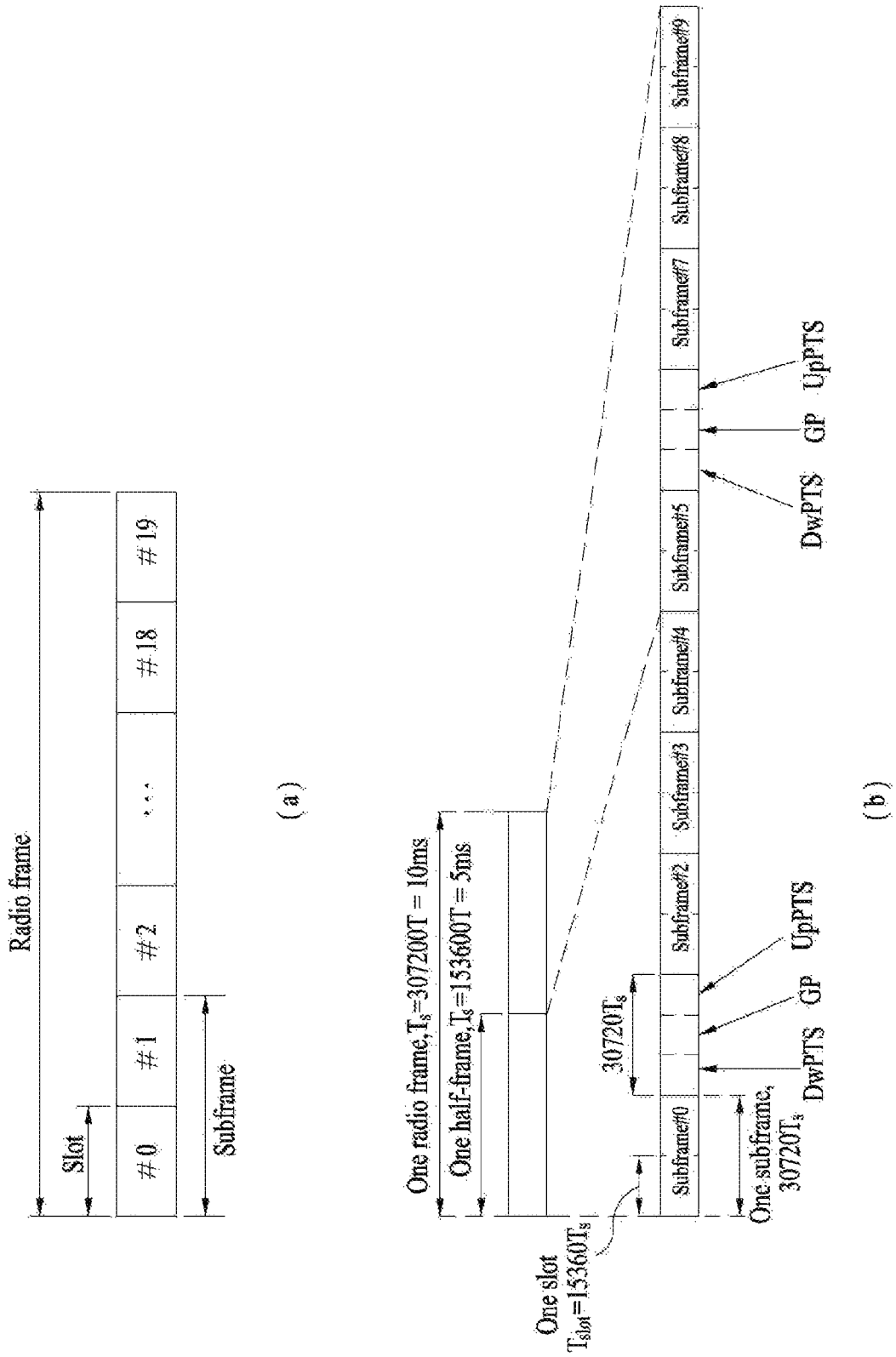
FIG. 1 is a diagram showing a structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless Packet communication system, uplink and/or downlink data Packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
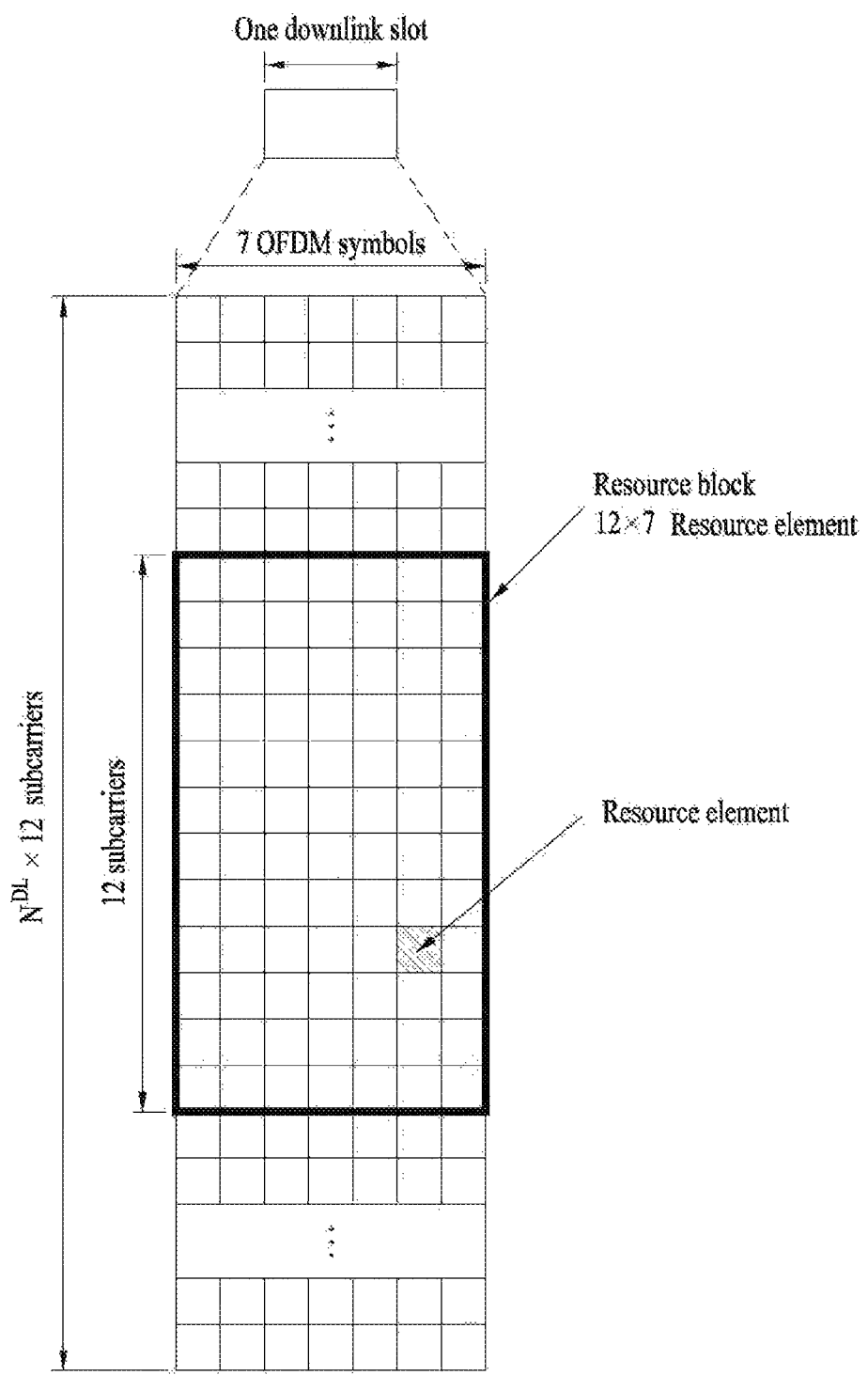
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
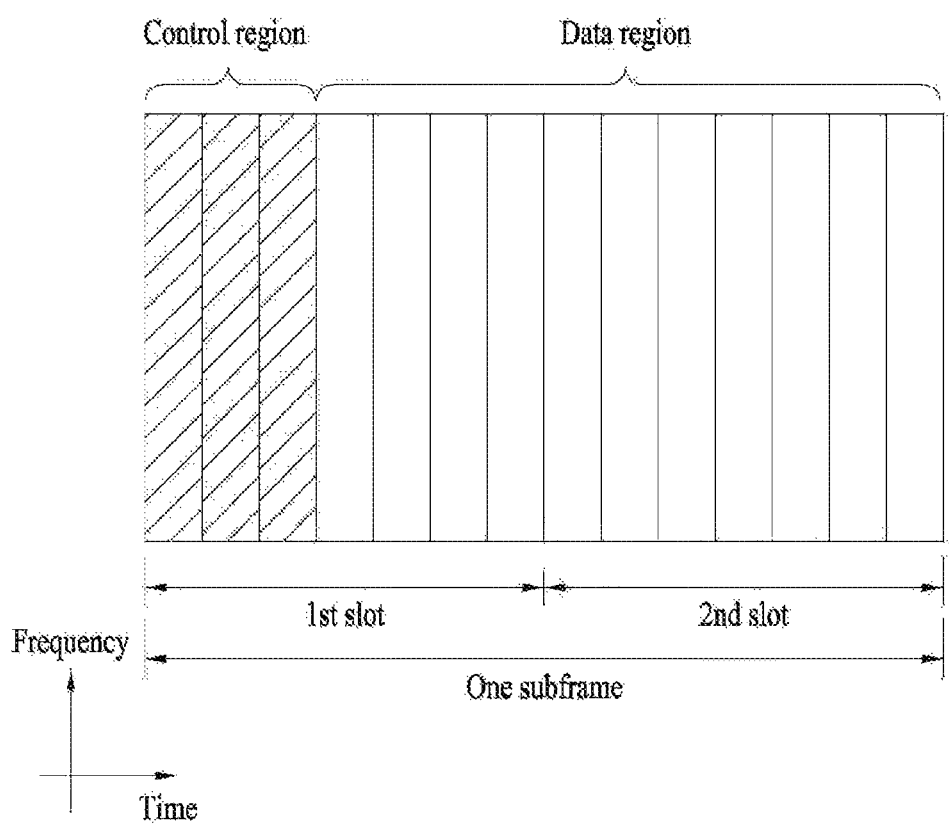
FIG. 3 is a diagram showing a structure of a downlink (DL) subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
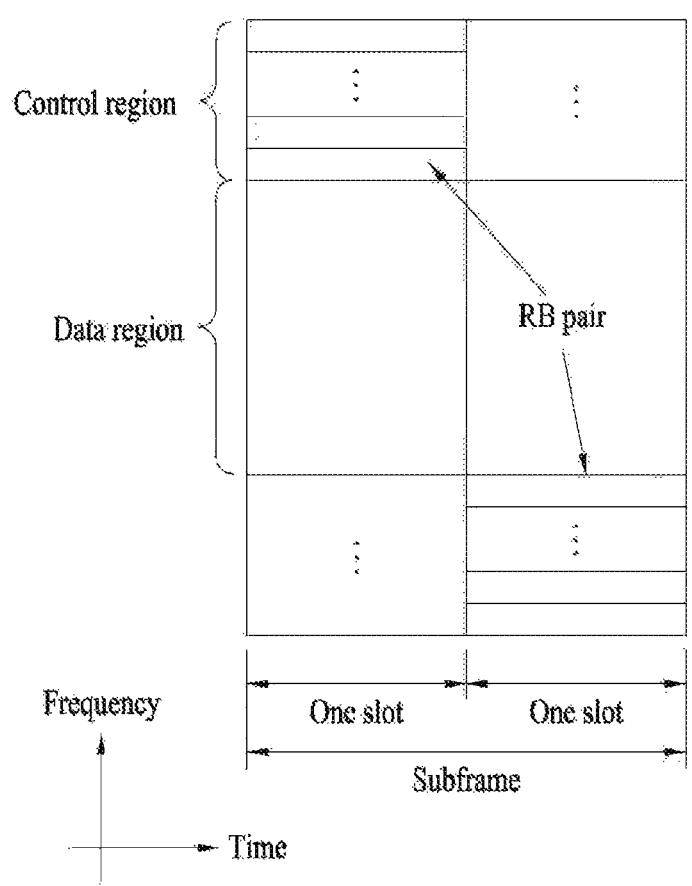
FIG. 4 is a diagram showing a structure of an uplink (UL) subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a Packet is transmitted on a radio channel. In view of the nature of the radio channel, the Packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s = [s_1, s_2, \ldots, s_{N_T}]^T \quad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \Lambda, P_{N_T}$, respectively, the transmission information with adjusted transmit powers can be represented as Equation 3.

$$\hat{s} = [\hat{s}_1, \hat{s}_2, \ldots, \hat{s}_{N_T}]^T P_1 s_1, P_2 s_2, \ldots, P_{N_T} s_{N_T}]^T \quad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring NT transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ can be expressed by using the vector X as follows.

$$X = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, y_{N_R}$ of the antennas can be expressed as follows.

$$y = [y_1, y_2, \ldots, y_{N_R}]^T \quad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T h_{i1}, h_{i2}, \ldots, h_{iN_T}]$$ [Equation 7]

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix}$$ [Equation 8]

An AWGN (Additive White Gaussian Noise) is added to the actual channels after a channel matrix H. The AWGN $n_1$, $n_2, \ldots, n_{N_R}$ respectively added to the NR receive antennas can be expressed as follows.

$$n = [n_1, n_2, \ldots, n_{N_R}]^T$$ [Equation 9]

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R)$$ [Equation 11]

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In the description of the present document, 'rank' for MIMO transmission indicates the number of paths capable of sending signals independently on specific time and frequency resources and 'number of layers' indicates the number of signal streams transmitted through the respective paths. Generally, since a transmitting end transmits the number of layers corresponding to the rank number, one rank has the same meaning of the layer number unless mentioned specially.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

Figure 6:
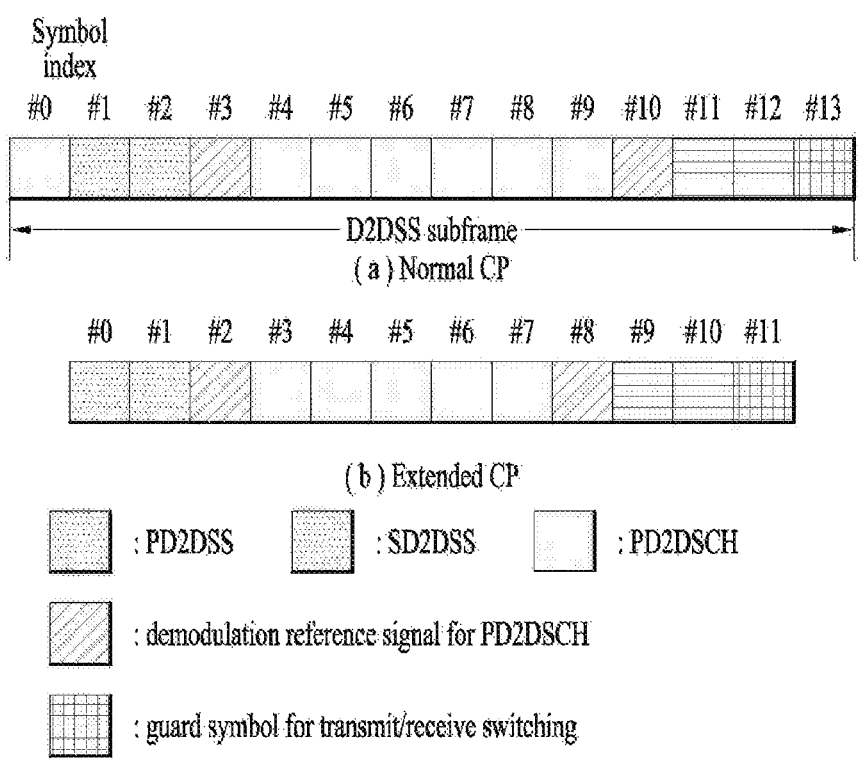
FIG. 6 shows a subframe for transmitting a D2D synchronization signal.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS). Unlike a DL PSS, the PD2DSS may use a different Zadoff-chu root index (e.g., 26, 37). And, the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. Unlike PSS/SSS of DL, the PD2DSS/SD2DSS follows UL subcarrier mapping scheme. FIG. 6 shows a subframe in which a D2D synchronization signal is transmitted. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS. A DMRS can be used to demodulate the PD2DSCH.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 7:
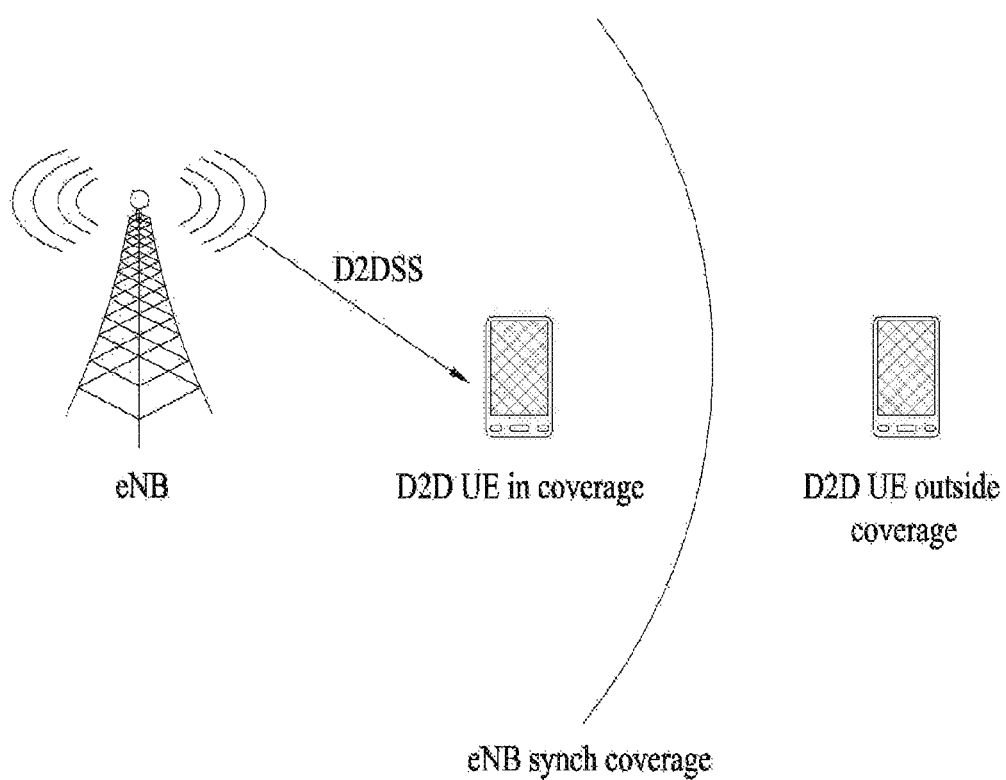
FIG. 7 is a diagram to describe a relay of a D2D signal.

In a situation illustrated in FIG. 7, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE.

D2D Resource Pool

FIG. 8 shows an example of a UE1, a UE2 and a resource pool used by the UE1 and the UE2 performing D2D communication. In FIG. 8 (a), a UE corresponds to a terminal or such a network device as an eNB transmitting and receiving a signal according to a D2D communication scheme. A UE selects a resource unit corresponding to a specific resource from a resource pool corresponding to a set of resources and the UE transmits a D2D signal using the selected resource unit. A UE2 corresponding to a reception UE receives a configuration of a resource pool in which the UE1 is able to transmit a signal and detects a signal of the UE1 in the resource pool. In this case, if the UE1 is located at the inside of coverage of an eNB, the eNB can inform the UE1 of the resource pool. If the UE1 is located at the outside of coverage of the eNB, the resource pool can be informed by a different UE or can be determined by a predetermined resource. In general, a resource pool includes a plurality of resource units. A UE selects one or more resource units from among a plurality of the resource units and may be able to use the selected resource unit(s) for D2D signal transmission. FIG. 8 (b) shows an example of configuring a resource unit. Referring to FIG. 8 (b), the entire frequency resources are divided into the $N_F$ number of resource units and the entire time resources are divided into the $N_T$ number of resource units. In particular, it is able to define $N_F*N_T$ number of resource units in total. In particular, a resource pool can be repeated with a period of $N_T$ subframes. Specifically, as shown in FIG. 8, one resource unit may periodically and repeatedly appear. Or, an index of a physical resource unit to which a logical resource unit is mapped may change with a predetermined pattern according to time to obtain a diversity gain in time domain and/or frequency domain. In this resource unit structure, a resource pool may correspond to a set of resource units capable of being used by a UE intending to transmit a D2D signal.

A resource pool can be classified into various types. First of all, the resource pool can be classified according to contents of a D2D signal transmitted via each resource pool. For example, the contents of the D2D signal can be classified into various signals and a separate resource pool can be configured according to each of the contents. The contents of the D2D signal may include SA (scheduling assignment), a D2D data channel, and a discovery channel. The SA may correspond to a signal including information on a resource position of a D2D data channel, information on MCS (modulation and coding scheme) necessary for modulating and demodulating a data channel, information on a MIMO transmission scheme, information on TA (timing advance), and the like. The SA signal can be transmitted on an identical resource unit in a manner of being multiplexed with D2D data. In this case, an SA resource pool may correspond to a pool of resources that an SA and D2D data are transmitted in a manner of being multiplexed. The SA signal can also be referred to as a D2D control channel or a PSCCH (physical sidelink control channel). The D2D data channel (or, PSSCH (physical sidelink shared channel)) corresponds to a resource pool used by a transmission UE to transmit user data. If an SA and a D2D data are transmitted in a manner of being multiplexed in an identical resource unit, D2D data channel except SA information can be transmitted only in a resource pool for the D2D data channel. In other word, resource elements (REs), which are used to transmit SA information in a specific resource unit of an SA resource pool, can also be used for transmitting D2D data in a D2D data channel resource pool. The discovery channel may correspond to a resource pool for a message that enables a neighboring UE to discover transmission UE transmitting information such as ID of the UE, and the like.

Although contents of D2D signal are identical to each other, it may use a different resource pool according to a transmission/reception attribute of the D2D signal. For example, in case of the same D2D data channel or the same discovery message, the D2D data channel or the discovery signal can be classified into a different resource pool according to a transmission timing determination scheme (e.g., whether a D2D signal is transmitted at the time of receiving a synchronization reference signal or the timing to which a prescribed timing advance is added) of a D2D signal, a resource allocation scheme (e.g., whether a transmission resource of an individual signal is designated by an eNB or an individual transmission UE selects an individual signal transmission resource from a pool), a signal format (e.g., number of symbols occupied by a D2D signal in a subframe, number of subframes used for transmitting a D2D signal), signal strength from an eNB, strength of transmit power of a D2D UE, and the like. For clarity, a method for an eNB to directly designate a transmission resource of a D2D transmission UE is referred to as a mode 1. If a transmission resource region is configured in advance or an eNB designates the transmission resource region and a UE directly selects a transmission resource from the transmission resource region, it is referred to as a mode 2. In case of performing D2D discovery, if an eNB directly indicates a resource, it is referred to as a type 2. If a UE directly selects a transmission resource from a predetermined resource region or a resource region indicated by the eNB, it is referred to as a type 1.

Transmission and Reception of SA

A mode 1 UE can transmit an SA signal (or, a D2D control signal, SCI (sidelink control information)) via a resource configured by an eNB. A mode 2 UE receives a configured resource to be used for D2D transmission. The mode 2 UE can transmit SA by selecting a time frequency resource from the configured resource.

Figure 9:
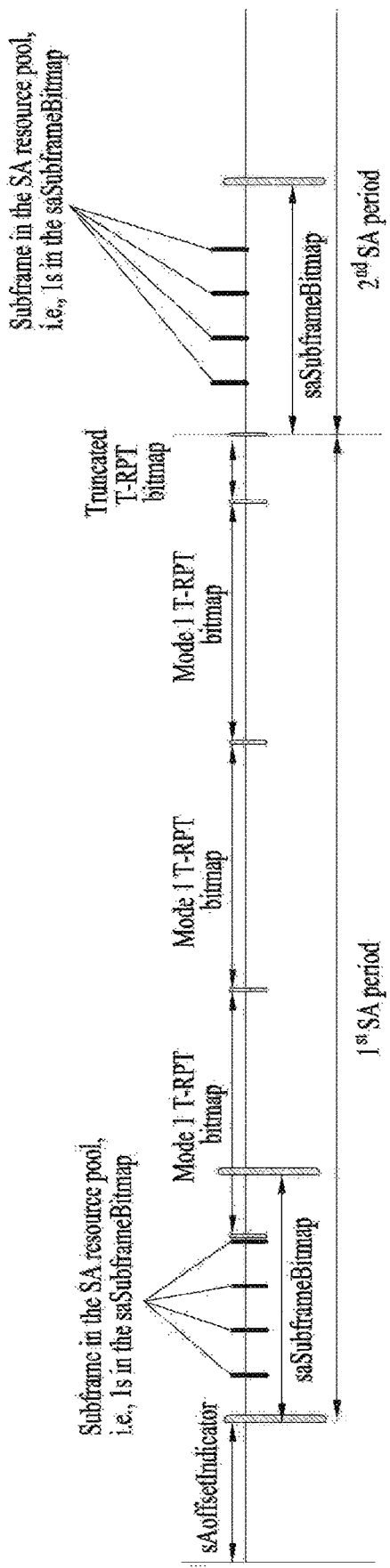
FIG. 9 is a diagram to describe an SA period.

The SA period can be defined as FIG. 9. Referring to FIG. 9, a first SA period can start at a subframe apart from a specific system frame as much as a prescribed offset (SAOffsetIndicator) indicated by higher layer signaling. Each SA period can include an SA resource pool and a subframe pool for transmitting D2D data. The SA resource pool can include subframes ranging from a first subframe of an SA period to the last subframe among subframes indicated by a subframe bitmap (saSubframeBitmap) to transmit SA. In case of mode 1, T-RPT (time-resource pattern for transmission) is applied to the resource pool for transmitting D2D data to determine a subframe in which an actual data is transmitted. As shown in the drawing, if the number of subframes included in an SA period except the SA resource pool is greater than the number of T-RPT bits, the T-RPT can be repeatedly applied and the lastly applied T-RPT can be applied in a manner of being truncated as many as the number of remaining subframes. A transmission UE performs transmission at a position where a T-RPT bitmap corresponds to 1 in an indicated T-RPT and 4 transmissions are performed in a MAC PDU.

Figure 10:
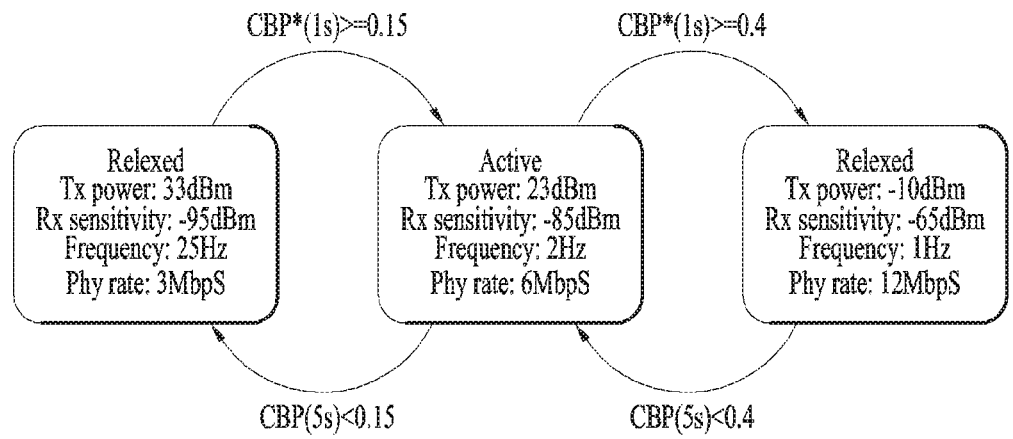
FIG. 10 is a diagram to describe DCC (distributed congestion control).

FIG. 10 shows an example of an operation scheme for DCC (distributed congestion control) defined in 802.11p. Regarding DCC, each UE measures a CBP (channel busy percentage). If a load is equal to or greater than a predetermined level, a state (relaxed, active, restrictive) is changed. When the state is changed, Phy.rate, sensing threshold, and message transmission frequency are simultaneously changed as well as Tx power. Moreover, as the state is changed, an inter message reception time is changed considerably. In such DCC, each time a state is changed, too many parameters are changed at a time. Hence, it is disadvantageous in that it is difficult to obtain information indicating which parameter affects performance.

In the following description, a method of generating and transmitting a reference signal and data applicable to D2D, V2X, new RAT (radio access technology), mmWave (millimeter wave) and the like is examined Prior to the description, several terms are defined as follows.

F-node: A device controlling V2X communication at a fixed location or a device offering help shall be called a fixed node. F-node may be an eNB type or a UE type. F-node may be called an RSU (rode side unit).

V-UE: A wireless UE mounted on a moving vehicle or a UE used by a driver of a moving vehicle shall be named a V-UE.

P-UE: A UE possessed by a person moving on a street shall be called a Pedestrian UE (P-UE). The person may be moving by a bicycle or another transport means (Segway, electric wheel). And, the P-UE indicates a user equipment having mobility lower than that of V-UE in general.

UE behavior can be represented as operating in different behavior when all or some of the following parameters are different.

MCS: modulation and coding

Tx power: UE's transmission power

Message generation period: Period for a UE to send a message

Repetition number: # of retransmissions performed for a single MAC PDU by a UE

Sensing threshold: Threshold of RSSI, RSRP or the like when a UE determines whether a channel is idle or busy. Particularly, the sensing threshold may be associated with a sensing method. When sensing is performed, if a measurement value measured by a UE is higher than a threshold, it is determined as busy.

Contention window (CW) size: If it is known that a channel is empty through other information beforehand or it is determined as idle, a corresponding UE can decrement a backoff counter by 1 each in a contention window. So to speak, the counter is initially set to a CW size. Each time a channel is idle, the counter is decremented by 1. If the counter becomes 0, transmission is performed.

When UEs measure/sense a presence or non-presence of occupation of resource in DCC and the like, a method of taking correlation with a known sequence can be used as a more accurate energy sensing method (i.e., a method of determining whether a signal is transmitted on a specific radio resource) rather than sensing energy simply. Here, DMRS can be used as the known sequence. According to a related art, DMRS will be generated to work to a bandwidth of DMRS carrying data. Yet, according to this scheme, since DMRS is generated for a different data size, if measurement is performed by taking correlation with a sequence, a receiving UE is unable to know a signal bandwidth of a transmitting UE accurately. Thus, as correlation should be taken for sequences of several lengths, implementation complexity of the receiving UE may increase. This causes the same problems to a case that a transmitting UE is not aware of a bandwidth (RB number) used for data transmission in New RAT and the like. For example, if a transmitting UE is unable to indicate a bandwidth of a data signal accurately through a control signal, a receiving UE should take correlation for sequences of several lengths, implementation complexity of the receiving UE may increase rapidly.

To solve such a problem, a method of generating and transmitting a reference signal and data according to one embodiment of the present invention is described as follows.

Embodiment 1

A UE generates a sequence corresponding to a basic bandwidth and is also able to generate a DMRS (demodulation reference signal) corresponding to a full bandwidth by mapping the generated sequence to a frequency band. Here, the basic (DMRS) bandwidth may mean 1/N of a full bandwidth usable for D2D or New RAT. N may be determined in advance or include a value configured by a network.

Figure 11:
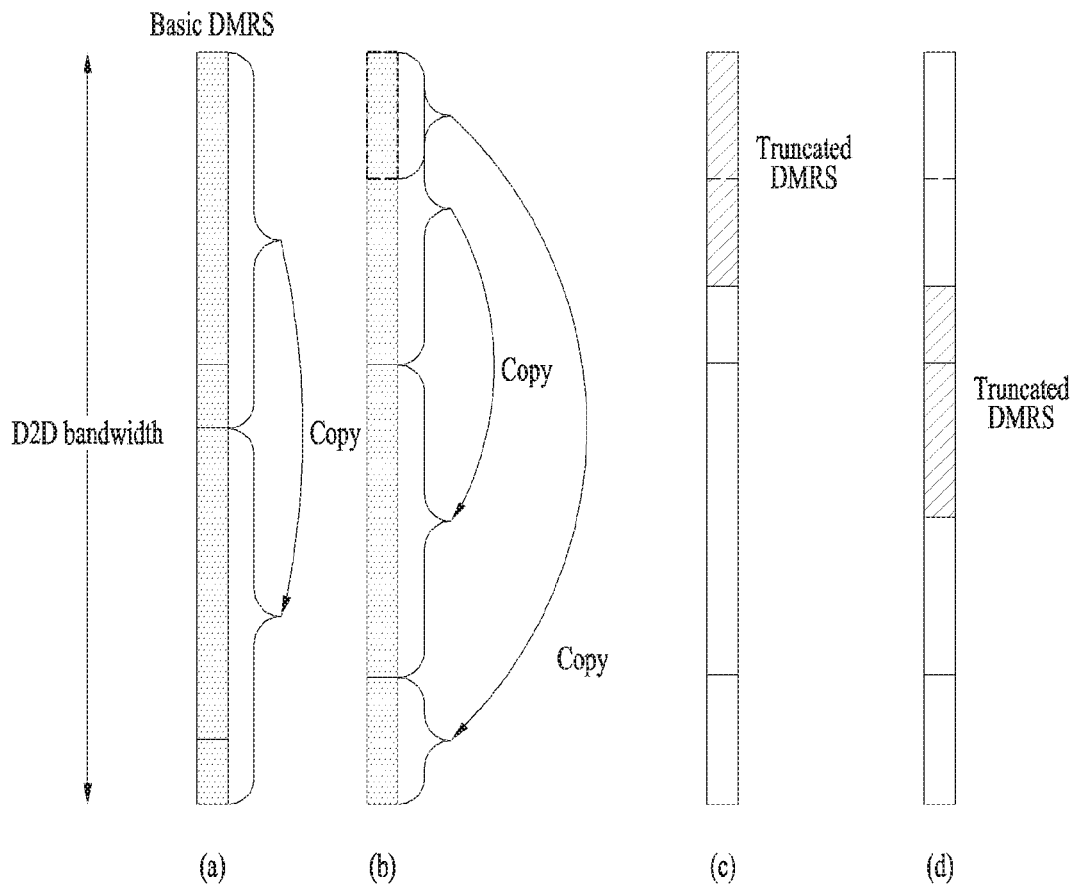
FIG. 11 is a diagram to describe a first embodiment of the present invention.

For the sequence corresponding to the basic bandwidth, a sequence used for the existing LTE DMRS generation may be reused. Or, the sequence corresponding to the basic bandwidth may include a CAZAC sequence of the largest prime number not exceeding a size of the basic bandwidth. From the sequence corresponding to the basic bandwidth, the DMRS corresponding to the full bandwidth can be generated by the two kinds of methods shown in FIG. 11 (a) and FIG. 11 (b). FIG. 11 (a) shows a method of mapping a generated sequence corresponding to a basic bandwidth to a frequency resource within the basic bandwidth sequentially and repeatedly and then repeating the sequence within a full bandwidth. Namely, in FIG. 11 (a), a CAZAC sequence of a largest prime number smaller than a half (i.e., basic DMRS bandwidth) of a bandwidth is generated. Then, this sequence is mapped to a frequency resource within a basic bandwidth sequentially and repeatedly. Thus, DMRS corresponding to a full bandwidth is generated by repeating/copying a sequence mapped to a basic bandwidth by an amount of the full bandwidth.

FIG. 11 (b) shows a method of generating DMRS corresponding to a full bandwidth by mapping a sequence corresponding to a basic bandwidth to a frequency resource within the full bandwidth. Namely, in FIG. 11 (b), when a (D2D) bandwidth is halved, a CAZAC sequence of a maximum length (not exceeding the half bandwidth) is repeated in a frequency domain. Namely, a CAZAC sequence of a largest prime number not exceeding a basic bandwidth is generated and then mapped within a full bandwidth sequentially and repeatedly.

The DMRS corresponding to the full bandwidth, which is generated by the above description, can be truncated by an amount corresponding to a bandwidth of data to be transmitted. A UE can transmit the truncated DMRS and the data. For instance, assuming that a sequence of a basic bandwidth within a signal transmission possible frequency resource is sequentially mapped to each subcarrier, a corresponding sequence is transmitted on a subcarrier to transmit a signal. Namely, each UE can truncate and use DMRS in a frequency region selected when data is transmitted. Particularly, if a D2D resource pool is configured discontinuously in a frequency domain, it is preferable that DMRS amounting to each subband length is generated and used. FIG. 11 (c) shows an example of a DMRS truncation method with DMRS is generated using the method of FIG. 11 (b).

The aforementioned DMRS corresponding to the full bandwidth can be identically generated by a UE that receives data. Namely, a receiving UE generates a sequence corresponding to a basic bandwidth by the aforementioned method, generates a DMRS corresponding to a full bandwidth by mapping the sequence to the full bandwidth, and is then able to perform a measurement using it. Particularly, when it is difficult to accurately indicate where is a band for transmitting a signal in mmWave, New RAT and the like [i.e., in case of mmWave, since path attenuation of a signal is severe, accurate beamforming is essential. In order to obtain whether a signal is transmitted on a prescribed region before knowing an accurate beam (e.g., for the purpose of receiving an RACH signal, (normal or service/application specific) PBCH, or the like, RS signal correlation may be necessary.], if the receiving UE is not aware that a transmitting UE will transmit a signal using a prescribed frequency band (RBs), a UE can be aware of a band for receiving data more efficiently by performing correlation with a received signal (including a truncated DMRS) on the DMRS corresponding to a full bandwidth, which is generated by the method proposed by the present invention.

The basic bandwidth may be determined in a manner that a rate of a minimum data bandwidth over a basic bandwidth is equal to or greater than a preset threshold. Or, such a threshold may be signaled to a UE by a network. This is to prevent PAPR from increasing if a difference between a minimum data bandwidth and a basic bandwidth is considerably big. Particularly, in case that a frequency region size of actually transmitted data considerably differs from a (D2D) bandwidth [e.g., as the (D2D) bandwidth is 50 RB, it is 1 RB in case of transmitted D2D data], if truncation is performed and transmission is performed by taking IFFT, there is an effect that PAPR increases rapidly. Such a PAPR increase becomes intensified as a rate difference between a basic DMRS bandwidth (e.g., 1/N of a full bandwidth usable for D2D or New RAT) and a bandwidth (e.g., data RB) used for data transmission increases more. Hence, by determining that a rate (minimum data bandwidth/basic bandwidth) of a minimum data bandwidth over a basic bandwidth becomes equal to or greater than a preset threshold, the PAPR increase can be suppressed. Here, the threshold is a condition value for satisfying the value of 'minimum data bandwidth/basic bandwidth' and may include 0.04. Or, the threshold may be a value selected from a range of 0.025~1. In order to meet such a limiting condition, it is able to consider two kinds of methods. The minimum data bandwidth is increased (i.e., a bandwidth of a signal for transmitting a signal to the minimum is set equal to or greater than a predetermined value). Or, if the minimum data bandwidth is fixed, a basic bandwidth size can be decreased [by decreasing a basic bandwidth for generating a reference signal, a rate of minimum signal bandwidth over basic bandwidth can be increased.]

Figure 12:
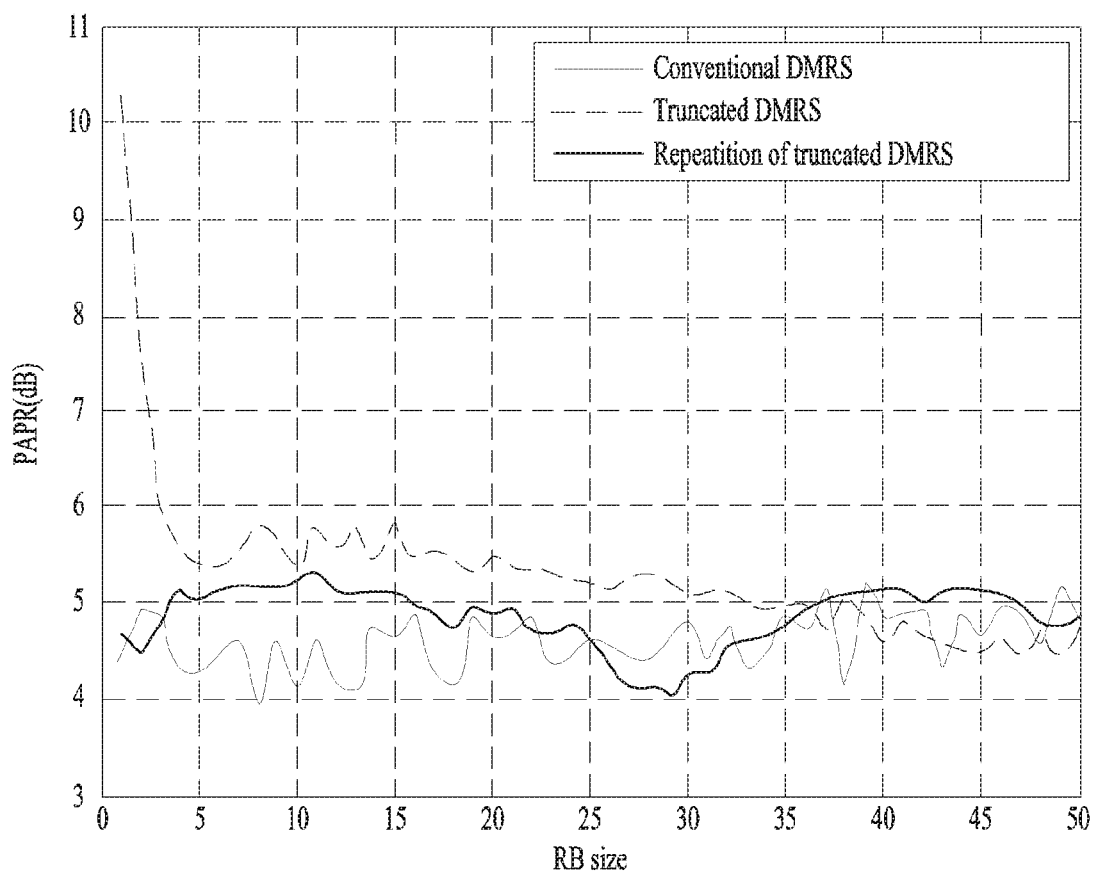
FIG. 12 shows a simulation result of the first embodiment of the present invention.

Thus, a rate of a basic DMRS bandwidth over a minimum data bandwidth (i.e., a rage of a basic bandwidth over the minimum data bandwidth) is equal to or greater than a predetermined threshold, a PAPR does not increase considerably despite truncation, which can be confirmed by the simulation result shown in FIG. 12. In FIG. 12, an average PAPR of DMRS is compared according to a data RB size. A conventional DMRS means a DMRS generated to work to a data RB size. A truncated DMRS means a DMRS when truncation is performed on the assumption that 50-RB DMRS is a basic DMRS. Repetition of truncated DMRS means a case that 25-RB DMRS is assumed as a basic DMRS (a basic bandwidth) (i.e., a case by the aforementioned method of Embodiment 1). According to the simulation result, in the repetition of truncated DMRS, it can be observed that a PAPR is lowered considerably at the narrow band transmission (i.e., a case that data is transmitted on a very small bandwidth).

Embodiment 2

Embodiment 2 relates to a method of generating DMRS in (frequency domain) basic resource unit size of data and, if a transmission amount of data exceeds the basic resource unit, generating DMRS repeatedly in a frequency domain. Here, a subchannel (for D2D) is determined in the frequency domain beforehand and data is scheduled based on this unit. In doing so, DMRS is generated with reference to a basic resource unit (N RBs) (here, N may be a value determined in advance or a value signaled by a network (eNB) or an RSU) and is repeatedly generated in the frequency domain. In doing so, an existing DMRS generates a CAZAC sequence of a largest prime number smaller than N RBs. And, by a difference between N*12 and a largest prime number (resource elements), mapping is sequentially performed from the beginning of the CAZAC sequence. (circular shift type) In doing so, assuming DMRS generated for the N-RB size, a basic DMRS unit may be repeated in the frequency domain. In this case, the CAZAC sequence is not accurately repeated in the frequency domain. Instead, a modified CAZAC sequence of which length is elongated by a circular shift is repeated in the frequency domain. If so, a PAPR may get worse or the intrinsic property of the original CAZAC sequence may be lost. To complement this, it can be filled with a CAZAC sequence generated with an original largest prime number by repeating the sequence in the frequency domain.

Figure 13:
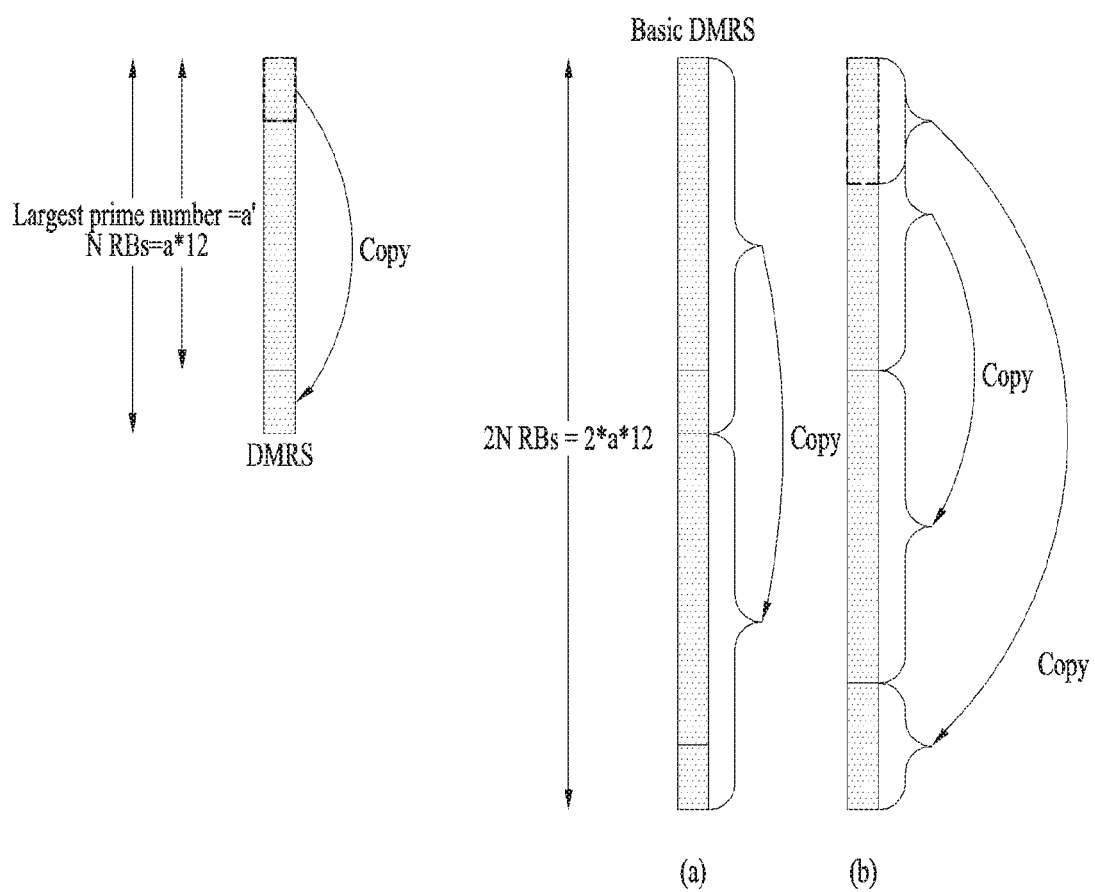
FIG. 13 and FIG. 14 are diagrams to describe various embodiments of the present invention.

FIG. 13 (a) shows a method of repeating N-RB DMRS in a frequency domain, and FIG. 13 (b) shows a method of generating DMRS by repeating a CAZAC sequence generated with a largest prime number of N RBs in a frequency domain. This method includes a case of filling it by repeating DMRS of 1 RB extremely. Namely, in case that a specific UE should transit data of 5 RBs, 5-RB DMRS is generated by repeating DMRS of 1 RB in the frequency domain.

Embodiment 3

Figure 14:
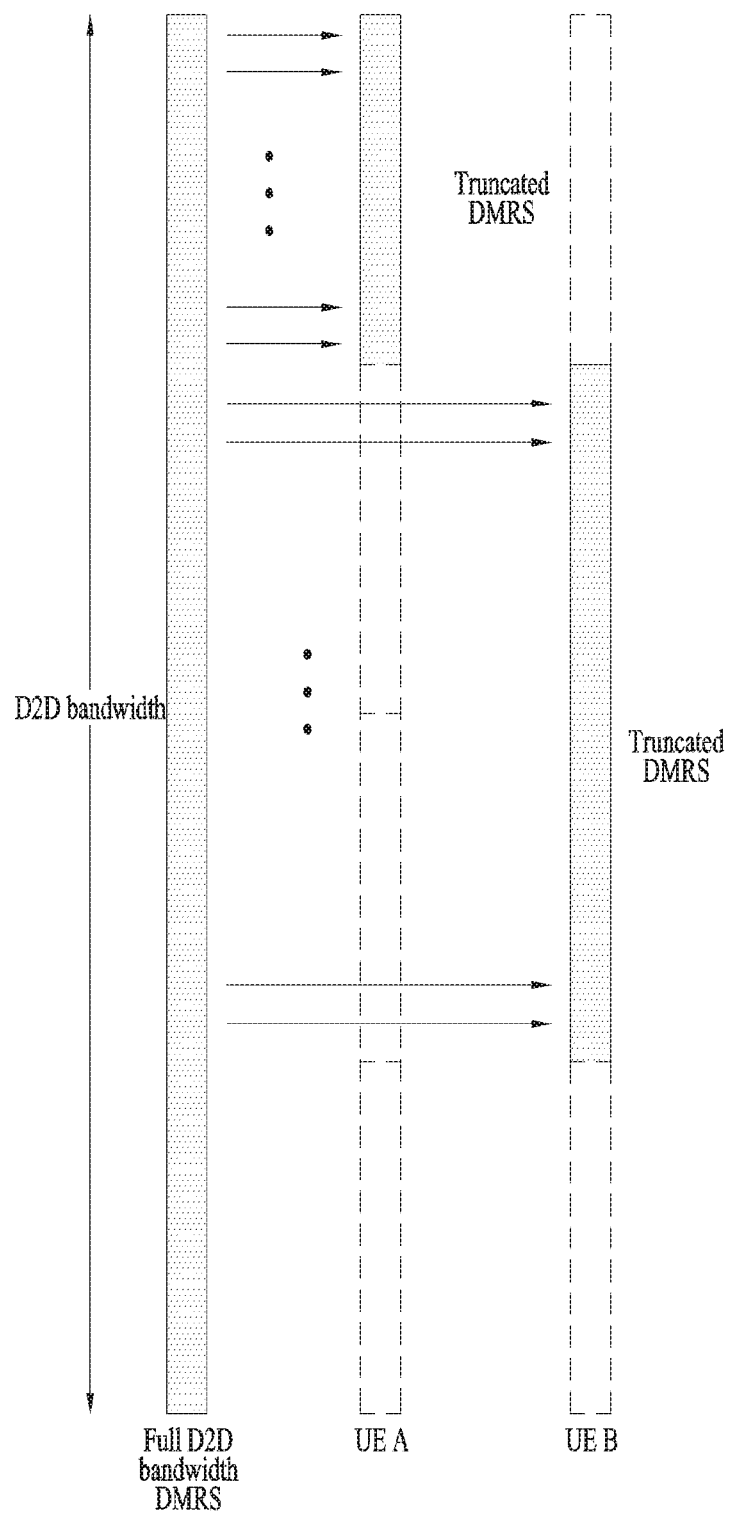

DMRS of a long length is generated and can be used by being truncated to work to a frequency resource of transmitted data. For example, DMRS is used in a manner of generating DMRS with a maximum bandwidth (available for D2D) and then truncating it to work to an allocated RB size. According to this scheme, in case that a receiving UE performs a measurement by taking correlation with DMRS, it is able to take correlation using DMRS in a fixed size irrespective of a bandwidth of allocated data. Hence, implementation complexity of UE is lowered advantageously. Moreover, when DMRS is generated, it can be always generated with reference to a full (D2D) bandwidth. Hence, implementation is simplified. FIG. 14 shows an example of a truncated DMRS. Although a UE A and a UE B use data of different bandwidths, respectively, they generate DMRS in a full bandwidth and use them by truncating them in part. When a receiving UE takes DMRS correlation to measure an interference amount in a corresponding subframe, it is able to advantageously measure an Rx power by taking correlation with DMRS of a full bandwidth despite not knowing an actually data transmitted region. Namely, if the proposed scheme is utilized, DMRS blind detection complexity is reduced.

Meanwhile, regarding the proposed scheme, a different scheme is applicable depending on a type or size of a V2X message. For example, in case of a periodic message, the method of Embodiment 2 is usable. In case of an event-triggered message, the method of Embodiment 1 is usable.

Meanwhile, control information and data may be simultaneously transmitted in a single subframe. In this case, for a DMRS configuring method, the following two methods can be considered.

According to a first method, a subchannel size is determined in advance. And, it is able to determine DMRS by a subchannel unit irrespective of control information transmission per subchannel. In doing so, a per-subchannel DMRS determining method may use one of Embodiments 1 to 3.

According to a second method, a control information region and a data region are transmitted using separate DMRSs. Assuming that a specific region in a frequency domain is a region for transmitting control information in advance, a UE can perform blind decoding on the control information region first. Thereafter, the UE performs decoding on the data region based on the decoded control information.

The first method assumes that the control information region is determined as a specific region of each subchannel in advance. Since control information and data can go through a single DFT spreading, PAPR is not increased additionally. Hence, the first method is more advantageous than the second method that should assume multi-cluster transmission.

If a size of a first data exceeds a single subchannel size, DFT spreading can be performed over a subchannel. In this case, it is disadvantageous in that blind decoding should be performed on control information and data for several sub0channel sizes. To solve such a problem, DFT spreading is always performed on 'control information+data' by a subchannel unit. If data to be transmitted exceeds a single subchannel size, it is able to perform multi-cluster transmission of another 'control information+data' using another separate subchannel. In doing so, in order to limit an excessive count of multi-cluster transmissions, it is able to limit the maximum number of subchannels transmittable in a single subframe per cluster size. For example, in case of dividing 48 RBs by 8 subchannels, the maximum number of subchannels transmitted by a single UE is limited to 2 [two cluster transmission], whereby a maximum bandwidth can be limited to 16 RBs. If wideband transmission is required like an event triggered message, it is able to consider a scheme of transmitting a subchannel by setting a subchannel size to a large size or transmitting a subchannel several times in a time domain.

As examples for the aforementioned proposed schemes can be included as one of the implemented methods of the present invention, they can be apparently regarded as a sort of proposed schemes. Although the aforementioned proposed schemes can be implemented independently, they can be implemented in form of combination (or mergence) entirely or in part. A rule can be defined in a manner that a base station informs a UE of applicability information of the proposed methods (or, information on rules of the proposed methods) through predefined signaling (e.g., physical layer signaling, upper layer signaling).

Device Configuration According to Embodiment of Present Invention

FIG. 15 is a diagram for a configuration of a transmitting point device and a user equipment device according to one embodiment of the present invention.

Referring to FIG. 15, a transmitting point device 10 according to the present invention may include a receiving device 11, a transmitting device 12, a processor 13, a memory 14 and a plurality of antennas 15. A plurality of the antennas 15 may mean a transmitting point device supportive of MIMO transmission and reception. The receiving device 11 can receive various signals, data and information in uplink from a user equipment. The transmitting device 12 can transmit various signals, data and information in downlink to the user equipment. And, the processor 13 can control overall operations of the transmitting point device 10.

The processor 13 of the transmitting point device 10 according to one embodiment of the present invention can process or handle the items required for the respective embodiments mentioned in the foregoing description.

The processor 13 of the transmitting point device 10 performs functions of operating and processing information received by the transmitting point device 10, information to be transmitted by the transmitting point device 10, and the like. The memory 14 can store the operated and processed information and the like for a prescribed period and be substituted with such a component as a buffer (not shown in the drawing) and the like.

Referring still to FIG. 15, a user equipment device 20 according to the present invention may include a receiving device 21, a transmitting device 22, a processor 23, a memory 24 and a plurality of antennas 25. A plurality of the antennas 25 may mean a user equipment device supportive of MIMO transmission and reception. The receiving device 21 can receive various signals, data and information in downlink from a transmitting point. The transmitting device 22 can transmit various signals, data and information in uplink to the transmitting point. And, the processor 23 can control overall operations of the user equipment device 20.

The processor 23 of the user equipment device 20 according to one embodiment of the present invention can process or handle the items required for the respective embodiments mentioned in the foregoing description.

The processor 23 of the user equipment device 20 performs functions of operating and processing information received by the user equipment device 20, information to be transmitted by the user equipment device 20, and the like. The memory 24 can store the operated and processed information and the like for a prescribed period and be substituted with such a component as a buffer (not shown in the drawing) and the like.

In the above-mentioned detailed configurations of the transmitting point device and the user equipment device, the contents or items explained in the descriptions of the various embodiments of the present invention may be independently applicable or two or more embodiments of the present invention may be simultaneously applicable. And, redundant descriptions shall be omitted from the following description for clarity.

The description of the transmitting point device 10 with reference to FIG. 15 may be identically applicable to a relay node device as a DL transmitting entity or a UL receiving entity. And, the description of the user equipment device 20 with reference to FIG. 15 may be identically applicable to a relay node device as a UL transmitting entity or a DL receiving entity.

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another. Therefore, the present invention is non-limited by the embodiments disclosed herein but intends to give a broadest scope matching the principles and new features disclosed herein.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. And, it is apparently understandable that an embodiment is configured by combining claims failing to have relation of explicit citation in the appended claims together or can be included as new claims by amendment after filing an application.

INDUSTRIAL APPLICABILITY

The embodiments of the present invention mentioned in the foregoing description are applicable to various kinds of mobile communication systems.

What is claimed is:

1. A method of generating and transmitting a reference signal and data in a user equipment of a wireless communication system, comprising:
    generating a sequence corresponding to a basic bandwidth;
    generating a DMRS (demodulation reference signal) corresponding to a full bandwidth by mapping the generated sequence to a frequency band;
    truncating the generated DMRS by an amount corresponding to a bandwidth of data to transmit; and
    transmitting the truncated DMRS and the data,
    wherein the basic bandwidth is determined in a manner that a rate of a minimum data bandwidth over the basic bandwidth is equal to or greater than a preset threshold.

2. The method of claim 1, wherein the threshold is 0.04.

3. The method of claim 1, wherein the DMRS corresponding to the full bandwidth is identically generated by a user equipment receiving the data.

4. The method of claim 3, wherein the DMRS corresponding to the full bandwidth, which is generated by the user equipment receiving the data, is used for correlation with the truncated DMRS.

5. The method of claim 1, wherein the sequence corresponding to the basic bandwidth comprises a CAZAC sequence of a largest prime number not exceeding a size of the basic bandwidth.

6. The method of claim 1, wherein the DMRS corresponding to the full bandwidth is generated by mapping the generated sequence to a frequency resource within the basic bandwidth sequentially and repeatedly and then repeating the sequence mapped to the basic bandwidth in the full bandwidth.

7. The method of claim 1, wherein the DMRS corresponding to the full bandwidth is generated by mapping the generated sequence to a frequency resource within the basic bandwidth sequentially and repeatedly.

8. A user equipment, comprising:
    a transmitter and a receiver; and
    a processor configured to generate a sequence corresponding to a basic bandwidth, generate a DMRS (demodulation reference signal) corresponding to a full bandwidth by mapping the generated sequence to a frequency band, truncate the generated DMRS by an amount corresponding to a bandwidth of data to transmit, and transmit the truncated DMRS and the data,
    wherein the basic bandwidth is determined in a manner that a rate of a minimum data bandwidth over the basic bandwidth is equal to or greater than a preset threshold.

9. The user equipment of claim 8, wherein the DMRS corresponding to the full bandwidth is identically generated by a user equipment receiving the data.

10. The user equipment of claim 9, wherein the DMRS corresponding to the full bandwidth, which is generated by the user equipment receiving the data, is used for correlation with the truncated DMRS.

11. The user equipment of claim 8, wherein the sequence corresponding to the basic bandwidth comprises a CAZAC sequence of a largest prime number not exceeding a size of the basic bandwidth.

12. The user equipment of claim 8, wherein the DMRS corresponding to the full bandwidth is generated by mapping the generated sequence to a frequency resource within the basic bandwidth sequentially and repeatedly and then repeating the sequence mapped to the basic bandwidth in the full bandwidth.

13. The user equipment of claim 8, wherein the DMRS corresponding to the full bandwidth is generated by mapping the generated sequence to a frequency resource within the basic bandwidth sequentially and repeatedly.

* * * * *